Jan. 22, 1957  P. EISLER  2,778,762
ELECTRIC CAPACITOR AND METHOD OF MAKING SAME
Filed July 26, 1951
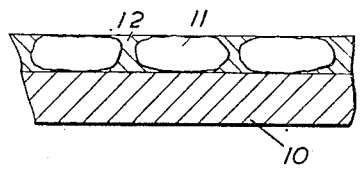
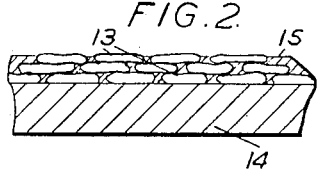
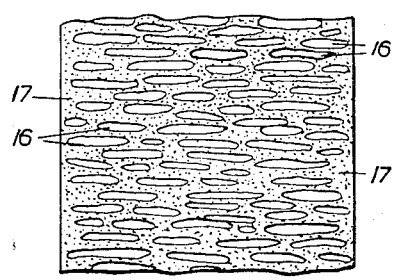
Inventor
PAUL EISLER
By
Emery, Holcombe & Blau
Attorneys 2,778,762

ELECTRIC CAPACITOR AND METHOD OF MAKING SAME

Paul Eisler, London, England, assignor to Technograph Printed Circuits Limited, London, England, a company of Great Britain Application July 26, 1951, Serial No. 238,668

Claims priority, application Great Britain November 11, 1948

3 Claims. (Cl. 154—80)

This invention relates to dielectric material in sheet form for electric capacitors. It also embraces a multi-layer sheet material comprising at least one conductive electrode layer and a dielectric layer, for fabricating electric capacitors and printed circuits containing capacitors. It also embraces methods of making such materials.

It is one object of the invention to provide thin sheets or films of dielectric material of high dielectric constant. In some forms the sheets or films are sufficiently flexible to enable them to be folded without harm.

Another object of the invention is to provide a multi-layer sheet material suitable for fabricating electric capacitors or printed circuits which contain capacitors.

According to one aspect of the present invention, dielectric material in sheet form for electric capacitors consists of a thin insulating matrix in which are embedded particles of high permittivity, so arranged that the dielectric consists substantially of portions of the matrix material in parallel with the particles.

The particles preferably are in the form of flakes. The matrix material may be flexible and the embedded flakes long and relatively narrow, these flakes being so arranged that their major axes all lie approximately parallel so that the dielectric material can readily be folded about an axis parallel with the major axis of the flakes.

The particles can be made in a variety of ways, some of which will be described in more detail hereinafter.

In one form of the invention the thickness of the particles is substantially the same as the thickness of the dielectric sheet so that a single particle will come into contact with both the electrodes of the capacitor. In other forms of the invention the dielectric material has at least two layers of particles, the particles of one layer being in contact, or almost so, with the particles of an adjacent layer. The particles of the outer layers of the dielectric touch, or almost touch, the electrodes, so that when a capacitor is charged the field lines will extend from one electrode to the other almost entirely through the high permittivity particle material. In this way the desired parallel arrangement of particle material and matrix material is maintained, even in a multi-layer dielectric.

It is preferred that the matrix material itself should have a relatively high dielectric constant.

According to another aspect of the invention, sheet material for fabricating electric capacitors or printed circuits containing capacitors, comprises a sheet of conductive metal foil, and adhering to at least one side thereof, a dielectric material comprising particles embedded in a matrix of the kind referred to. Where the matrix material is in itself insufficiently adherent to the metal foil, the dielectric material may be secured to the metal foil by a conductive cement.

According to a further aspect of the invention, a method of making the sheet material referred to includes applying the dielectric material to the metal foil by first coating the foil, or a layer of conductive cement thereon, or a previously applied layer of dielectric material, with matrix material, then applying the particles to the matrix, pressing the coated foil to embed the particles in the matrix, and, if necessary, removing any surplus matrix material to expose at least a portion of the outer surfaces of the embedded particles.

Another method of making the sheet material includes fusing a brittle film of high permittivity ceramic material on a temporary support, impregnating the film with an insulating impregnant to render it impervious, securing a sheet of metal foil to the film, stripping the metal foil together with the ceramic material from the temporary support whereby the ceramic material is broken into flakes secured to the foil, and applying the matrix material to the treated foil to fill the interstices between the ceramic flakes.

Various ways in which the invention may be carried into practice will now be described by way of example with reference to the accompanying diagrammatic drawings, in which:

Figure 1 is a fragmentary section through a piece of metal foil provided on one side with a dielectric layer embodying the invention;

Figure 2 is a fragmentary section showing a piece of metal foil provided on one side with a multi-layer dielectric coating;

Figure 3 is a plan of a piece of dielectric material showing the orientation of elongated flakes so as to permit folding.

If it is desired to make a capacitor of high capacity and small volume it is essential that a dielectric material of high permittivity should be used.

It has hitherto been proposed to make sheets of high permittivity material, such as alkaline earth titanates, in suitable mixes by a kind of casting process, firing these sheets and using them in similar ways as mica sheets are used (see Howarth, G. N., Breckenridge, R. G., and Brownlow, J. M., "Fabrication of thin ceramic sheets for capacitors," Journal of the American Ceramic Society, Ceramic Abstracts, volume 30, No. 8, 1st August 1947, pages 237–242).

This method does not gives flexible sheets, nor sheets thin enough, nor is it cheap enough for wide scale use.

Another attempt has been made to create a high permittivity material by mixing a proportion of high permittivity ferro-electric ceramic powders, such as the titanates of barium, magnesium, or strontium, with plastics, but it was found that such a high proportion of the powders had to be added in order to improve the dielectric constant of the material appreciably that the product lost much of its attractiveness.

In one form of the present invention, coatings of high dielectric constant may be created on metal films or foils if the coatings consist of high permittivity ceramic particles embedded in an adherent insulating matrix such as resin, the particles being so orientated or disposed within the matrix that they extend through the whole thickness of the matrix, or at least through a very high proportion of this thickness, without necessarily extending over its whole area, or over so high a proportion of this area as to render the coating too brittle for practical purposes.

Ideally in such a coating a cross-section would reveal a rectangle of compact ceramic material next to one of the matrix material, two sides of each rectangle lying in the two boundary surfaces of the coating respectively, and the other two sides which divide the materials being as long as the coating is thick and running across perpendicular to the surfaces of the coating.

A capacitor having a composite dielectric of this structure can be symbolised theoretically by two compacitors connected in parallel, one with a ceramic dielectric and the other with a dielectric of matrix material. Consequently, in spite of the composite dielectric containing no higher proportion of ceramic material than the mixtures tried hitherto, it will nevertheless afford a much smaller capacitor of the same capacity, since capacitors with the composite dielectrics hitherto proposed could be symbolised theoretically by a capacitor with ceramic dielectric in series with a capacitor with a dielectric of matrix material.

It will be appreciated that this ideal structure cannot be realised fully, nor is it always desirable that it should be realised to such an extent, particularly as the voltage breakdown requirements can be met by leaving a very thin layer of high electric strength but low dielectric constant in series with the ceramic particles between the capacitor electrodes. However, this series connected layer must be as thin as possible, and in any case only a very small fraction of the total thickness of the dielectric, in order not to counteract too much the major structural advantages of the dielectric embodying this aspect of the invention.

The coating may be produced directly on an electrode, a metal foil for example, or it may be produced and also metallised while on a temporary support and completed when on the metal electrode. The preferred method is to produce the coating directly on a metal foil. In any case the problem is to include in the coating ceramic particles or layers of contiguous ceramic particles, of a thickness equal to the total thickness of the dielectric between the electrodes, which is in the range of fractions of a thousandth of an inch up to several thousandths of an inch.

One method of achieving this is first to produce a flaky powder of a high permittivity ferro-electric ceramic material of a thickness equal to or very nearly equal to the desired thickness of the coating. As shown in Figure 1, a piece of metal foil 10 is coated with a layer of flaky powder, the individual flakes 11 being orientated so that they lie flat on the foil as densely as possible. The coating is so arranged that the layer of flakes is in as close a contact with the foil as possible, and the gaps between the flakes are filled up by an adhesive flexible insulating material 12, for instance an elastic resin or synthetic rubber, which has good adhesion both to the ceramic particles 11 and the metal foil 10 and is a good dielectric material while of relatively low dielectric constant.

If a fairly thick coating is required, the flakes may be applied in several layers as shown in Figure 2. Care should be taken to ensure that the flakes 13 are in contact with one another and with the metal foil 14, or almost so, so that field lines can extend from one electrode to the other almost entirely through the flakes of high permittivity material. The matrix 15 bonds the flakes together and also secures them to the metal foil 14.

Where the resultant product is to be used to make a block capacitor or a printed circuit containing capacitors, which may be wound, folded or otherwise bent, it is essential that it should be flexible. It is therefore desirable, as shown in Figure 3, to have relatively long and narrow flakes of ceramic material 16 embedded in a matrix 17 and to orientate these flakes so that as well as lying flat on the foil as densely as possible, they also lie with their major axes in the direction parallel with the axis about which the sheet material will eventually be rolled, bent or folded. This operation can then be carried out easily and without severely disturbing the flakes.

In order to produce the flake ceramic powders the methods used in powder metallurgy for producing flaky metal powders can be suitably adapted. Such methods are well known and it is not necessary to describe them here. Other methods are possible as well, and some will be described below, but it should be understood that the accounts given are not by any means exhaustive.

One such method consists in preparing relatively fine ceramic powders by grinding or ball milling or other usual methods and compacting these powders, either dry or wet, by mechanical pressure into a brittle film of the required thickness. The compacting pressure may be exerted by rollers, platens, stamping, etc. The brittle film crumbles into flakes. To get flakes of the desired long narrow shape, the compacting or crumbling up may be done by riffled rollers. When a wet process is used the powders may be mixed with a liquid containing a very small amount of a binder. This helps in compacting though it detracts from the high dielectric constant of the flakes.

Another method consists of producing a coating of required thickness with a mix such as that described by Howarth, Breckenridge, and Brownlow (Journal of the American Ceramic Society, Ceramic Abstracts, vol. 30, No. 8, 1st August, 1947, pp. 237–242), on a support not attacked by the firing, firing to fuse the coating and then crushing the fired coating into flakes. The original coating may be produced by more usual coating means, since its thickness is smaller than the one described in the above mentioned publication. Other variations of detail procedure may be made, but essentially up to the crushing stage the procedure described there can be adopted, and in the following a ceramic film produced in this or a similar way will be referred to as a "fused ceramic film." One important variation, however, can be made in working the present invention: as it is not necessary to obtain a coherent film by the firing it is possible to put the original coating on a support which is destroyed coating to be put into the furnace, and assists in its fusing into flakes, or a flaky heap, or an easily dividable substance of flaky structure. Sheets of paper, paper coated with water glass, or other film, aluminium foil, etc., may serve as such support. The support may be coated with the mix and placed into the furnace either as single sheets, or a stack of sheets or as a roll. In case of contamination of the fused ceramic film by the destruction of this kind of support, the flakes have to be cleaned chemically. The flake shape may also be preformed by putting the coating on the support not only in the required thickness, but also in the desired shape, for instance by a stencilling device, or by combing the coating before it is dry.

Having got the flaky powder, powder compacted flakes or fused ceramic flakes, the coating of the metal foil is done in one example as follows:

The foil is coated on one side with an ink or resin of the desired properties such as power factor, electrical strength, elasticity, adhesion to the metal foil and the ceramic, viscosity at certain temperatures, etc. A coating of a drying oil, a linseed varnish, a styrene, isobutylene, or a silicone type resin or a synthetic rubber are examples. This coating will hereinafter be called the oil- or resin-coating.

While the coating is wet the flakes are dusted or rolled or otherwise put on, and by brushing or doctor blades or rollers it is ensured that they lie in a single layer flat on the oil or resin coating. To assist in this, the flakes may have been wetted so that a great surface tension between the oil or resin coating and the flakes exists at the rolling-on stage. Next, the flakes are pressed down on to the foil, for instance by passing the coated foil between heavy heated rollers, thereby squeezing the oil or resin coating out from between the flakes and the foil into the gaps between the flakes. The rolling also breaks the flakes which are too large, or too large in the rolling direction for the elasticity of the film required, and the oil or resin flows into these new gaps and breaks at the same time. In order to achieve this, the oil or resin coating must be so thin that the amount squeezed from underneath the flakes is not more than what will go into the gaps between the flakes. It actually should be less as will be seen later, and it must be or become so fluid that it will flow readily, which explains why the rollers are heated. In the case of an oil film heated rollers assist in drying of the oil, and they also guarantee the film thickness. It is usually not required nor desirable to squeeze the oil or resin film out completely from underneath the flakes, but at least sufficiently to reduce its thickness to a very small fraction of the film thickness.

The other side of the foil, hereinafter called the "back," is given an oil or resin coating even thinner than the side to which the flakes are applied. In order to make a complete capacitor, two coated foils are superimposed and this material may later on be rolled or folded up or laminated into a pile and cut, etc. When superimposing one foil over the other, and also in the later processes of rolling or piling, the back of one is laid over the flake-covered side of the other and the foils are hot pressed together so that the oil or resin coating of the back, where it lies between the flakes and the upper foil, is squeezed out and completes the filling up of the gaps between the flakes, so far not completely filled by the squeezed out resin of the flake-covered side of the foil. Consequently, it is seen that the thickness of the oil or resin coating of both sides of the foil must be so dimensioned that the quantity or volume of oil or resin over the active capacitor area is just about the same as the volume of the gaps between the flakes. In practice a slightly higher volume is taken, because of the thin layer between flakes and foils which cannot be, or is not desired to be, squeezed out, and the amount of oil or resin extruding over the edges of the foil.

The coated foils may be superimposed in staggered relationship so that one electrode overhangs at one side of the capacitor, while the other electrode overhangs at the other side. The coatings may be stripped from these over-hanging portions in order that they may provide the capacitor terminals.

For capacitors where a more intimate contact between the ceramic flakes and the metal foil is desired the procedure is varied, for instance as follows.

A brittle fused ceramic film is produced on a support not destroyed by the firing. The ceramic film is then impregnated with an insulating impregnant to fill up any interstices or cracks. A metal foil is then secured to the ceramic film with the aid of a conductive cement, and the foil, together with the ceramic film, is stripped off the support. The gaps and breaks are now filled up with an insulating material such as an oil or resin, which can be done during the superimposition of this foil with another by the oil or resin coat on the back of the superimposed foil, as previously described. The oil or resin film on the back of the foil must be sufficiently thick to fill all the gaps and breaks of the fused ceramic film when the two foils are squeezed together. Alternatively, the second foil may also be secured to the ceramic film with the aid of a conductive cement, care being taken to ensure that all gaps or breaks in the film have been filled up with a suitable insulating material. Again, the second foil may be replaced by a vacuum-deposited layer of aluminium.

Another method of making high permittivity capacitor material is by starting off with ceramic powders not necessarily of flake shape, though this is preferred, but of any shape as long as their grain size is approximately the same as the thickness of the dielectric film. These powders may for instance be produced by crushing ferro-electric ceramics and milling the material or pulverising it and sieving or otherwise grading it in similar ways as is done for metal powders. The powders are now put into a film in ways analogous to the process used for making films with metal powders. One such method consists of mixing these powders with an ink or paint medium which consolidates into an elastic material of the desired qualities, and printing or otherwise coating one side of a metal foil with it. In order to get the ferro-electric powders to settle on the foil and not to float on top of the ink there should be, contrary to requirements for metal powder inks, no big surface tension between the ink and ceramic powders, further, the specific gravity of the ink should be lower than that of the powder, and the viscosity of the ink may be very low. Rolling, wiping, brushing, etc., may be used to dimension the film correctly and to orientate the powders in the desired monolayer in close contact with the foil etc. Heating may be employed to get the paint or ink to the right viscosity, and constant stirring or some other means employed to keep the powders in suspension in the paint or ink duct. In order to combat the tackiness of the ink film when it is not required, for instance when immediate re-coiling of the foil is desired, and also to assist in gap filling, a fine powder of ferro-electric ceramic may be dusted on the film. The coated foil is processed further as described above to produce a material for making up capacitors of the wound, piled or cut out variety, etc., but it should be borne in mind that the coating of the foil with the ferro-electric powders of film thickness size is applied to one side of the foil only, so that on superposition of two such foils these powders stretch from one foil to the other substantially without an intermediate layer or break along the film.

The other principal method used in metal powder coating may also be employed, namely, the dusting on of the ferro-electric ceramic powders of film thickness size to a foil coated or printed with a tacky oil or resin film and the settling of the powders to the foil surface assisted by the specification of the oil or resin film, heat and pressure as above.

A further method consists essentially in preparing an intaglio printing plate or cylinder, similar to that used to print an ink film of film thickness, filling the cavities either with ferro-electric ceramic powders of film thickness or with fine powders of ferro-electric ceramic material and compacting the powders in these cavities by rolling, wiping the surface of the plate or cylinder with a doctor blade and transferring the content of the cavities to an oil or resin coated foil by, so to speak, printing it on to the foil.

Alternatively, it is possible first to give to the plate or cylinder a surface to which the powders and the oil or resin will not adhere, by chrome plating for instance, then to fill the cavities and compact the powders therein, then to fill the pores of the compacted powder areas with oil or resin, and then to imprint a metal foil. The surplus oil or resin is squeezed into the gaps left on the foil, which may be pre-coated with a thin oil or resin film if that surplus is not sufficient to fill the volume of the gaps. The gaps are predetermined, to some extent, by the screen of the intaglio plate or cylinder and this screen also effects the shaping of the compacts into long narrow flakes.

There are also other means available to achieve the carrying out of the invention. A dielectric film of the described structure may be formed on a metal foil as a fabric which can be rolled, or otherwise shifted off a temporary support on to the metal foil, in a number of ways of which the following are examples:

A paper, textile glass fibre, synthetic rubber or plastic film of the thickness of the dielectric film desired, may be made like a net with very tiny holes or slots, for instance by weaving, rolling or other perforating, etc. The holes or slots, the latter running in the direction across the flexing direction of the film, are filled up with ferro-electric ceramic material by making a fine dispersion of this material in water or a volatile liquid and coating this net repeatedly until all the holes or slots are filled up. The excess is doctored off, and the fabric is rolled or pressed to compact the flakes which are in the holes or slots stretching across the whole thickness of the fabric. By first suitably impregnating the paper or textile, or by suitable choice of the plastic, a bond to the ceramic and an elastic film can thus be achieved. This film can be used between metal foils like the other dielectric films described previously, but a single layer only should be used to ensure that the ferro-electric flakes stretch across the whole dielectric without interruption.

Another way to create such a dielectric film is to compact fine ferro-electric ceramic powders into a brittle film (dry or wet) or obtain such a brittle film by stripping a fused ceramic film from its support, or arranging flaked ceramic powders of film thickness in a single layer. Then a resin is cast on to such film and forced between the gaps of the ceramic layer. The excess is squeezed off by a porous platen or removed by blotting paper. This is followed by a mechanical and/or solvent cleaning of the surface of the film after the resin has consolidated, jellied or become firm by cooling. In order to make the film sufficiently elastic for rolling into a rolled block capacitor, heating it during the rolling operation may be helpful.

It should be emphasised that the gaps between the ceramic particles which are filled by the elastic insulating material form an essential part of the film. They not only link the ceramic particles together, bond to the foil and act as a dielectric insulator, but their spacing, the flexibility of the elastic insulating material and the degree of wetting and of adherence to the ceramic determine the usefulness of the film which is essentially a single layer link of ferro-electric and elastic particles. The elastic insulating material linking the ferro-electric ceramic powders assumes an even greater importance contributing substantially to the dielectric constant for the whole film if the invention cannot be carried out, as in the above examples, by using a monolayer of ferro-electric particles of film thickness size, but has to be carried out by the use of ferro-electric powders of much smaller size without using the possibility, also described above, of compacting these finer powders into film thickness size particles.

Although it is not possible under such circumstances to achieve as high a dielectric constant of the whole film as in previously described examples, a great improvement over dielectric films hitherto proposed is possible by a combination of an elastic insulating material of as high a dielectric constant as can be found and as heavy a loading of the film with the fine ferro-electric powders as can be achieved without destroying the degree of flexibility required. There are further considerations: By using thin flaky powders orientated parallel to the metal foil and by using an elastic insulating material which has, or is given, such low viscosity during the formation of the film, for instance by heating or a high volatile solvent content, or its pre-polymerisation state as in casting resin, that the flaky ferro-electric powders settle one on top of the other with very thin, if any, layers of the elastic binder between the powders, a further great improvement of the dielectric constant of the film is possible.

The elastic insulating binder need for many applications not have too small a loss factor; in the above case the high dielectric constant is more important and consequently polar materials are the first choice. Examples of suitable materials are silicone resins, neoprene, linseed oil, phenol formaldehyde resins, cellulose acetate and methyl cellulose, and chlorinated waxes, particularly if they are compounded with rubber such as neoprene or with silicone to reduce their brittleness. All these substances are available in solutions and some can be formulated into printing inks or paints for a variety of application devices; some can be brought into a very low viscosity range by heat and there is a choice of a wide range of elasticity between the waxes and phenol formaldehyde resins on the one side and the synthetic rubbers and silicones on the other.

Regarding the ferro-electric ceramic particles: If no particles of dielectric thickness are available, nor any facility to compact fine powders into suitable thick flakes, any size powder of flaky shape is the next choice. If these are not available either, fine powders of any shape may be mixed to a paste with a solution of one of the polar substances described above, using a minimum of solid and a maximum of volatile solvent, and rolled under heavy pressure into a very thin brittle film and broken up so that flaky resin, or wax bound particles, are formed which may be less than dielectric thickness. Alternatively and preferably, a thin coating with minimum binder and an overload of ferro-electric ceramic powder is printed, or coated, on a flexible foil or other temporary carrier, dusted with powder as long as it is tacky, and left to dry or consolidate into a hard brittle film which falls into thin flakes when stripped off by bending or rolling the flexible carrier. A linseed oil medium with phenol formaldehyde resin addition, or any solution of the polar substances given above, is possible, but a substance which consolidates into an insoluble or less soluble state is preferred for this flake making. An advantage of these flakes is that they form a good bond when they are incorporated in the final coating on the metal foil because the flake binder links strongly with the elastic insulating matrix material, particularly if both are the same substance, even though in different states of polymerisation or viscosity at the time of formation of the coating. If even this facility of flake making is not available the only means to orientate the fine ferro-electric ceramic powders so that they stretch across the dielectric irregularly, but with as small interstices as possible, is to use a maximum of powders and a very low viscosity matrix substance of relatively high dielectric constant and press the powders together and on the metal foil by rolling or other means when forming the coating.

It will be appreciated that since the dielectric film constitutes a unit with and is supported by the metal foil, dielectric films of a consistency, mechanical frailness, low elasticity and brittleness can be tolerated in the present invention which would not be practicable if the film had to be self-supporting and capable of being handled separately from the metal foil.

The preferred method of capacitor manufacture under such circumstances is to print or coat a metal foil repeatedly with an ink or paint made up from the polar substances described of very low viscosity, preferably owing to a high volatile solvent content, heavily pigmented with the thin flaky powders, dust each layer with the powders as long as the ink is tacky, and heavily roll to compress the layers and squeeze out the binder as long as it is fluid.

As a further modification of any of the examples described above, before putting the insulating material on the foil, the foil may be pre-coated with a thin layer of a conductive cement to enhance the adherence between the foil and the insulating coating. Another film of high square area resistance and intended for other printed circuit purposes, e. g. for use as resistors in the circuit, may also be interposed between the foil and the dielectric, but although this layer or the conductive cement may have a fairly high specific resistance, across its thickness the layer will be so thin that its ohmic resistance is negligible.

This application is a continuation-in-part based upon applicant's United States patent application Serial No. 121,739 filed October 17th, 1949, now Patent 2,607,825 issued August 19, 1952.

What I claim as my invention and desire to secure by Letters Patent is:

1. A method of making electric capacitors and printed circuits containing capacitors, which comprises applying to a metal foil a thin coating consisting of a flexible adherent insulating matrix in which are embedded long and relatively narrow flakes of a material of high permittivity extending throughout the thickness of the matrix, orientating these flakes so that their major axes all lie approximately parallel, superimposing a conductive layer over the coating, and folding the multi-layer product about an axis parallel to the major axis of the said flakes.

2. A method of making electric capacitors and printed circuits containing capacitors which comprises fusing a brittle film of high permittivity ceramic material on a temporary support, impregnating the film with an insulating impregnant to render it impervious, securing a sheet of metal foil to the film, stripping the metal foil together with the ceramic material from the temporary support whereby the ceramic material is broken up into flakes secured to the foil, applying an adherent insulating coating to the treated foil and ceramic material to fill the interstices between the ceramic flakes so that the thickness of the coating is approximately equal to the thickness of an average flake, and thereafter applying a conductive layer to the surface of the coating.

3. In a capacitance means having electrodes in form of two metal foils, several dielectric layers disposed between the two foils, each dielectric layer being composed of a hardened insulation layer adhering to an adjacent metal foil and an adjacent layer and of a multitude of elongated flake-like elements of high permittivity material embedded in the insulation material of the respective layer and distributed throughout the said material in a spaced relationship such that the flat sides of said elements and portions of the insulation material therebetween are disposed substantially parallel to the planes of said foils, the thickness of each of said layers being approximately equal to the thickness of the elements embedded therein and the elements in different layers being staggered relative to each other so as to form substantially continuous pathways of high permittivity material between the metal foils.

References Cited in the file of this patent

UNITED STATES PATENTS

| | | |
|---|---|---|
| 1,200,041 | Speed | Oct. 3, 1916 |
| 1,842,970 | Hovey | Jan. 26, 1932 |
| 2,107,780 | Danziger et al. | Feb. 8, 1938 |
| 2,161,888 | Rearick | June 13, 1939 |
| 2,177,266 | Schupp et al. | Oct. 24, 1939 |
| 2,221,983 | Mayer et al. | Nov. 19, 1940 |
| 2,223,833 | Sander | Dec. 3, 1940 |
| 2,279,762 | Scott et al. | Apr. 14, 1942 |
| 2,290,526 | Berkey et al. | July 21, 1942 |
| 2,322,353 | Fruth | June 22, 1943 |
| 2,384,541 | Fruth | Sept. 11, 1945 |
| 2,394,670 | Detrick | Feb. 12, 1946 |
| 2,443,663 | Rider et al. | June 22, 1948 |
| 2,484,214 | Ford et al. | Oct. 11, 1949 |
| 2,590,650 | Robinson | Mar. 25, 1952 |
| 2,619,443 | Robinson | Nov. 25, 1952 |

FOREIGN PATENTS

| | | |
|---|---|---|
| 584,672 | Great Britain | Jan. 21, 1947 |
| 632,203 | Great Britain | Nov. 17, 1949 |